(12) United States Patent
Buschmann et al.

(10) Patent No.: US 8,534,955 B2
(45) Date of Patent: Sep. 17, 2013

(54) TAMPER OF A SCREED OF A ROAD FINISHING MACHINE

(75) Inventors: Martin Buschmann, Neustadt (DE); Roman Munz, Neustadt (DE); Ralf Weiser, Ladenburg (DE); Klaus Bertz, Dittelsheim-Hessloch (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 286 days.

(21) Appl. No.: 12/944,435

(22) Filed: Nov. 11, 2010

(65) Prior Publication Data

US 2011/0123270 A1 May 26, 2011

(30) Foreign Application Priority Data

Nov. 20, 2009 (EP) .................................. 09014515

(51) Int. Cl.
*E01C 19/30* (2006.01)

(52) U.S. Cl.
USPC ..................................... 404/114; 404/133.05

(58) Field of Classification Search
USPC ........... 404/114, 133.05, 133.1, 133.2; 74/61
See application file for complete search history.

(56) References Cited

U.S. PATENT DOCUMENTS

| | | | |
|---|---|---|---|
| 5,165,820 A | 11/1992 | Bunk et al. | |
| 6,457,902 B1 * | 10/2002 | Artzberger et al. | 404/75 |
| 6,717,379 B1 | 4/2004 | Andersson | |
| 2010/0147090 A1 * | 6/2010 | Kuerten | 74/61 |

FOREIGN PATENT DOCUMENTS

| | | |
|---|---|---|
| DE | 3127377 A1 | 1/1983 |
| DE | 202005006059 U1 | 7/2005 |
| EP | 374428 A1 | 6/1990 |
| GB | 742141 A | 12/1955 |
| GB | 760725 A | 11/1956 |
| WO | 0055430 A1 | 9/2000 |
| WO | WO0055430 A1 | 9/2000 |

OTHER PUBLICATIONS

English translation of office action dated Jan. 30, 2012, which issued in corresponding Chinese application No. 201010550813.

* cited by examiner

*Primary Examiner* — Gary S Hartmann
(74) *Attorney, Agent, or Firm* — Fish & Richardson P.C.

(57) ABSTRACT

A tamper of a screed having an eccentric shaft including an eccentric section and an eccentric bushing rotatably mounted in a connecting rod driving a tamper bar. The stroke of the tamper bar is adjustable by a relative rotation between the eccentric shaft and the eccentric bushing, and a tappet and a preselection area with two tappet stop positions defining two different tamper bar strokes are provided between the eccentric shaft and the eccentric bushing, enabling adjustment of the tappet to each tappet stop position, by reversing the direction of rotation of the eccentric shaft to switch between the two strokes.

14 Claims, 4 Drawing Sheets

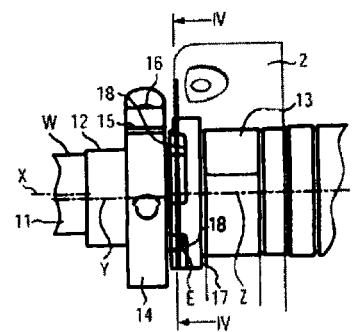
FIG. 3
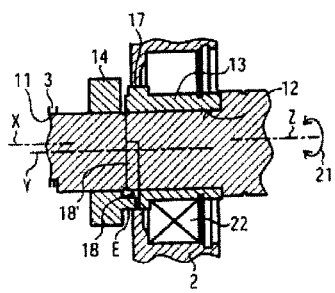
FIG. 4
FIG. 5

TAMPER OF A SCREED OF A ROAD FINISHING MACHINE

FIELD OF INVENTION

The invention relates to a tamper of a screed having an eccentric shaft arranged thereon which is rotatably mounted in a connecting rod driving a tamper bar, wherein the stroke of the tamper bar is adjustable by a relative rotation between an eccentric shaft and an eccentric bushing. A tappet and a pre-selection area with two tappet stop positions defining two different tamper bar strokes is functionally provided between the eccentric shaft and the eccentric bushing so that the tappet can be adjusted without tools to each tappet stop position by a reversing the direction of rotation of the eccentric shaft to switch between the two strokes.

BACKGROUND OF THE INVENTION

Tamper is a common term for a tamping device that precompacts laying material and is part of the standard equipment of a screed of a road finishing machine. The screed comprises a basic screed and optionally extendable screeds that can be extended at the basic screed for changing the working width, and optionally screed broadening parts attached as required. Each of these components of the screed comprises at least one tamper with a separate drive motor, typically a speed-controlled hydraulic motor. The tamper either acts alone in the screed for precompacting, or it acts in combination with an unbalanced mass vibration generator which generates unbalance pulses at the screed plate contributing to the precompacting.

SUMMARY OF THE INVENTION

Tampers, in combination with or without unbalanced mass vibration generators, are known, for example, from the technical document "Für jede Aufgabe die richtige Einbaubohle", No. 2400/10/2.1997, of the company Joseph Vögele AG, 68146 Mannheim/DE, pages 4, 8, 9, 11 to 15.

To achieve constant precompacting even when the pavement thickness is changed, for example adjusted at an external control stand of the screed by adjusting the vertical position of the articulation points of the tow bars at the road finishing machine, it is known to change the stroke of the tamper bar to adapt it to the pavement thickness. In the known tamper (document: "Für jede Aufgabe die richtige Einbaubohle", bottom left of page 2), this is accomplished in that during a laying interruption, the eccentric bushing in the connecting rod is rotated relative to the eccentric section of the eccentric shaft and again fixed at the eccentric shaft in another relative rotational position in a torque-proof manner. For this, it is necessary to release at least one straining screw of a straining ring at each of the several provided connecting rods, e.g. to rotate the eccentric shaft relative to the eccentric bushing, and to fix the straining ring again. Depending on the relative rotational position between the two eccentricities of the eccentric section of the eccentric shaft and the eccentric bushing, a total eccentricity results which corresponds to half the effective tamper bar stroke. During the operation of the tamper, the straining ring is non-positively fixed.

For example, eight connecting rods are provided in the basic screed, so that eight adjustment operations are required. If the screed also comprises extendable screeds and/or screed broadening parts, even more adjustment operations are also required at the tampers arranged there. This is time consuming and requires great care to achieve constant precompacting across the working width.

Principally, a smaller stroke of the tamper bar is appropriate for a small pavement thickness, while a larger stroke is appropriate for great pavement thicknesses. As the respective adjusted pavement thickness can inevitably vary or has to be varied intentionally, it would be appropriate to be able to change the stroke of the tamper bar selected for the adjusted pavement thickness at least within a limited range quickly, precisely and without any time consuming manual adjustment operations.

From EP 0 374 428 A, a tamper of a screed of a road finishing machine is known in which the eccentric bushing is fixed in the respective stop position on the eccentric section by means of a straining ring. After the straining ring has been released with a tool, the eccentric bushing can be rotated to a new rotational positioning relative to the eccentric section to change the tamper stroke before the straining ring is fixed again on the eccentric section. As the straining ring can be rotated without restrictions, the new adjustment must first be checked to be able to confirm the new tamper stroke as desired. A change of the tamper stroke requires a longer interruption of the operation of the screed and manual manipulations at the straining ring with at least one tool. The manipulations are cumbersome and time consuming as they are performed inside the screed, and there several times, that means at each eccentric bushing.

In a tamper known from DE 31 27 377 A, the eccentricity of the eccentric bushing can be changed by means of adjusting screws after cross screws of a straining ring have been released. A change of the tamper stroke requires a longer interruption of the operation of the screed and manual manipulations with tools.

GB 742 141 A and GB 760 725 A each disclose an eccentric crank drive of a crank press. An eccentric bushing is fixed on the eccentric shaft by means of a straining ring. Even after manipulations with a tool, the eccentric bushing can be adjusted to at least one other, predetermined rotational position.

DE 20 2005 006 059 U1 relates to an add-on compactor with unbalance elements rotatably driven by a hydraulic motor whose direction of rotation can be reversed. The unbalance elements assume different relative positions with respect to each other depending on the selected direction of rotation to be able to change the exciter power for a compactor plate facing the ground.

WO 00/55430 A relates to an unbalanced mass vibration generator driven with modulated multi-frequency vibrations for ground processing. In this compactor aggregate, work is performed in an oscillating manner with centrifugal forces by rotation of several eccentric masses. Several power cells are coupled to one transmission mass each which works the ground. Each cell has its own drive motor. The power vector diagram generated at the transmission mass is varied by the individual control of the individual power cells with respect to the rotational frequency, direction of rotation and phase position of the eccentric masses.

The object underlying the present invention is to provide a tamper of the type mentioned above which permits at least one change of stroke quickly, precisely and without any manual adjustment works.

This object is achieved with a tamper having an eccentric shaft that is rotatably driven by a drive and comprising at least one eccentric section and an eccentric bushing supported on the eccentric section in a torque-proof manner in at least one stop position, the eccentric bushing being rotatably mounted in a connecting rod driving a tamper bar with stroke motions, the stroke of the tamper bar being variable by adjustment of the relative rotational positioning between the eccentric bushing and the eccentric section, and each relative rotational positioning defining half of a tamper bar stroke, wherein at least one tappet and at least one preselection area functionally associated to the same are provided between the eccentric shaft and the eccentric bushing, wherein the preselection area is limited by two end stops for the tappet the circumferential distance between the end stops is greater than the extension of the tappet seen in the circumferential direction, and the preselection area or the tappet is embodied each at or in the eccentric shaft or at or in the eccentric bushing, that as drive of the eccentric shaft a hydraulic or electric motor whose direction of rotation can be reversed, or a hydraulic or electric motor with a fixed direction of rotation and a change gear is provided, and wherein the tappet can be adjusted without tools from one stop position to the other one by means of the drive by a reversal of the direction of rotation of the eccentric shaft and can be held in this stop position in the direction of rotation.

A hydraulic or electric motor whose direction of rotation can be reversed, or a hydraulic or electric motor with a fixed direction of rotation and a change gear for reversing the direction of rotation is used as a drive of the eccentric shaft. Just by a reversal of the direction of rotation of the eccentric shaft performed by means of the drive motor or the reverse gear, the adjusted stroke of the tamper bar is changed within the limited preselection range without any manual adjustment works to perform a quick and precise adaptation to a change of, for example, the pavement thickness. By the reversal of the direction of rotation, a relative rotational motion between the tappet and the preselection area takes place due to the rotational resistance of the eccentric bushing on the eccentric section of the eccentric shaft conditioned by the mass or compaction forces, by which motion the tappet is brought from one stop position to the respective other stop position of the preselection area. Thereby, the relative rotational positioning between the eccentric bushing and the eccentric section of the eccentric shaft changes, so that a new total eccentricity is adjusted from the two individual eccentricities of the eccentric section of the eccentric shaft and the eccentric bushing which corresponds to half a new tamper bar stroke. In the respectively adjusted tappet stop position, the eccentric bushing is coupled to the eccentric shaft in the then effective direction of rotation in a torque-proof manner. Between the two different strokes of the tamper bar, a predetermined stroke difference which can be selected e.g. by the radian measure of the preselection area and/or the circumferential extension of the tappet depending on the laying conditions, the change of stroke either to be greater or smaller can be performed just by changing the direction of rotation. If the respective tappet is provided at the eccentric bushing, the functionally associated preselection area is located at the eccentric shaft. A reversed arrangement is also possible and functions in the same way. The reversal of the direction of rotation can be controllable by an operator, for example from the driver stand of the road finishing machine and/or from an external control stand at the screed, or it is controlled automatically already in response to a change of at least one laying parameter, such as the pavement thickness and/or the laying speed, e.g. via the control device of the road finishing machine, taking into consideration the adjusted laying speed and/or pavement thickness. This discharges the driver or the personnel at the external control stand from permanently visually checking the achieved precompaction, and/or from having to control the reversal of the direction of rotation as appropriate after the laying speed and/or the pavement thickness has/have been changed. The reversal of the direction of rotation can also be performed with an invariable direction of rotation of the drive motor by means of a reversible gear. The gearboxes or drive motors for all provided eccentric shafts are appropriately connected in parallel, so that the reversal of the direction of rotation can be performed with one single changing operation for all tampers.

In one appropriate embodiment, the preselection area is formed in or at the eccentric bushing, and the tappet is provided in or at the eccentric shaft. This shall not exclude, as mentioned, the interchange of the positions of the preselection area and the tappet.

A particularly appropriate embodiment is characterized in that the preselection area or the tappet can be adjusted in the circumferential direction. This adjustment is not performed by a reversal of the direction of rotation, but it can be performed manually, as common before, or even by means of an adjustment drive by remote control. Such an adjustment in the circumferential direction for example permits to first preselect two tamper bar strokes of for example 2.0 mm and 4.0 mm for small pavement thicknesses, and to change between them just by a reversal of the direction of rotation, and to preselect two larger tamper bar strokes of e.g. 4.0 mm and 8.0 mm for a great pavement thickness with an e.g. manual adjustment in the circumferential direction, between which one can later switch just by a reversal of the direction of rotation. This means that the preselection optionally requires separate adjustment operations, but that the change between the respective preselected two strokes can be performed quickly and without tools just by one reversal of the direction of rotation each.

In another appropriate embodiment which leads to the same results, the tappet can be transferred between different circumferential positions relative to the connecting rod in the circumferential direction. The transfer for the preselection optionally requires manual intervention, however with the advantage that it is possible to adjust two different strokes in the respective preselection area just by a reversal of the direction of rotation.

In a further appropriate embodiment, several preselection areas are provided in the circumferential direction, which have the same or different circumferential distances between the respective two tappet stop positions, and the tappet can be selectively introduced in each one of the preselection areas for preselection. Here, too, e.g. manual adjustment works are required for introducing the tappet into the respective selected preselection area, with the result that it will then be possible to change between two different strokes just by reversals of the direction of rotation of the eccentric shaft. Nevertheless, only by e.g. one single adjustment, four strokes can be quickly utilized by a reversal of the direction of rotation.

In a further embodiment, several tappets having the same or different circumferential dimensions can be provided offset in the circumferential direction, each of which can be introduced into the at least one preselection area for preselection. Different circumferential dimensions of several tappets permit to change the stroke difference resulting between the two predetermined tappet stop positions with the reversal of the direction of rotation. This can be appropriate, for example, for small pavement thicknesses which vary less during laying than adjusted great pavement thicknesses.

In one simple embodiment, the tappet is an adjustment spring inserted in a longitudinal slot of the eccentric section of the eccentric shaft which engages in the preselection area formed in the eccentric bushing as recess with two end stops. The cooperation between the tappet and the preselection area moreover does not necessarily have to take place between the eccentric section of the eccentric shaft and the eccentric bushing, but could also take place from another site of the eccentric shaft with the eccentric bushing. The positions of the adjustment spring and the recess could be interchanged.

In one appropriate embodiment, the tappet is arranged on a support that can be fixed and adjusted on the eccentric shaft in the circumferential direction. Preferably, the tappet is arranged at or in a slotted straining ring as support that is tensioned in a torque-proof manner on the eccentric section or the eccentric shaft with at least one straining screw, which, after the straining screw has been released, can be rotated relative to the eccentric shaft or relative to the connecting rod and fixed in any desired new rotational position. This is a proven assembly type as it has been employed in tampers up to now only for manually adjusting a certain stroke.

In this embodiment, the eccentric bushing can comprise several recesses with two end stops each, the recesses being offset in the circumferential direction and defining preselection areas. The circumferential extensions of the several recesses, i.e. the circumferential distances between the end stops defining the tappet end positions or the stroke differences, can be the same or different. Different circumferential distances result in different stroke differences between the respective two strokes adjustable by reversals of the direction of rotation of the eccentric shaft.

BRIEF DESCRIPTION OF THE DRAWINGS

Embodiments of the subject matter of the invention will be illustrated with reference to the drawings. In the drawings:

FIG. 3 shows a plan view of a first embodiment of a stroke adjustment means with e.g. two preselection areas, FIG. 4 shows a cross-section to FIG. 3 in the cutting plane IV-IV in FIG. 3, FIG. 5 shows an axial section to FIGS. 3 and 4 in the cutting plane V-V in FIG. 4.

DETAILED DESCRIPTION OF THE INVENTION

Figure 2:
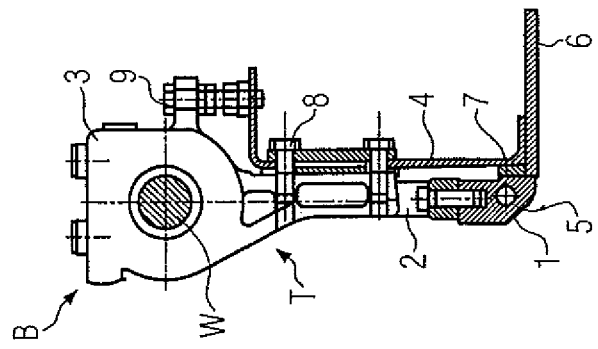
FIG. 2 shows a section in the plane II-II in FIG. 1 in an enlarged scale compared to FIG. 1.
Figure 1:
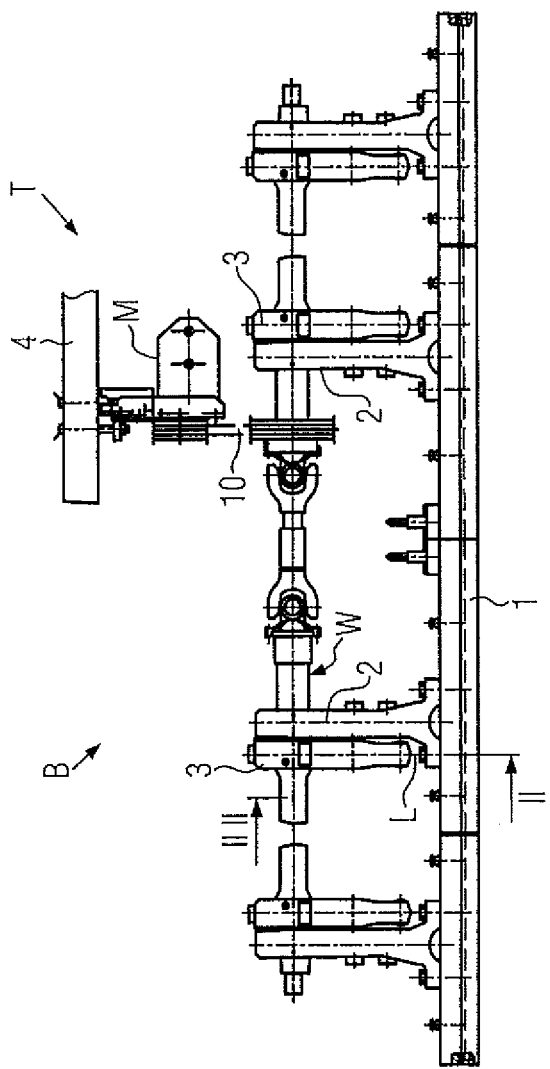
FIG. 1 shows a view of a tamper of a screed.

FIGS. 1 and 2 schematically show a tamper T of a screed B of a road finishing machine. The tamper T (tamping device) serves to precompact laying material during the laying of a pavement of bituminous or concrete laying material with a selectable pavement thickness, which is adjusted, for example, at tow points of tow bars of the screed but can vary or must be varied during the laying process.

The tamper T comprises a tamper bar 1 cyclically acting on the laying material with essentially vertical strokes, the tamper bar 1 either being continuous over the complete width over the component of the screed or being divided into individual sections. The tamper bar 1 is mounted to connecting rods 2 which transfer the strokes by the rotation of an eccentric shaft W and transmit them to the tamper bar 1. The eccentric shaft W is stationarily supported at a frame 4 of the screed B via bearing supports 3 which are fixed with mounting screws 8 and whose vertical height can be adjusted with adjusting screws 9, for example to align the bottom dead center of each tamper bar 1 with a screed plate 6 mounted at the bottom side of the frame 4.

As will be illustrated with reference to the following figures, the eccentric shaft W comprises an eccentric section in the region of the respective connecting rod 2 on which an eccentric bushing is arranged in a torque-proof manner which is rotatably mounted in the connecting rod 2. In the shown embodiment in FIG. 1, the eccentric shaft W is driven via a drive motor M (hydraulic or electric motor) whose direction of rotation can be reversed and a belt or chain drive 10. As an alternative, a drive motor M running in the direction of rotation could be provided which selectively drives the eccentric shaft W in the one or the other direction of rotation via a change gear (not shown). The drive motor M (with or without gear) is mounted to the frame 4 or another component of the screed. The eccentric shaft W can also be driven directly by the drive motor M.

In the sectional representation in FIG. 2, the tamper bar 1 comprises an internal channel which is used, for example, for introducing a heating element. The tamper bar 1 can be guided relative to the screed plate 6 by a guiding body 7 during its vertical strokes. In FIG. 2, dot-dash lines already indicate the eccentricity of the eccentric section of the eccentric shaft W not shown in FIGS. 1 and 2.

According to the invention, at least one tappet and at least one preselection area for two different tappet stop positions are provided in the tamper T between the eccentric shaft W and the respective connecting rod 2, which are associated to different strokes of the tamper bar 1. This will be illustrated first with reference to the embodiment of FIG. 3, FIG. 4 and FIG. 5.

In FIG. 3, the eccentric shaft W comprises a section 11 concentric with respect to the axis X which is used, for example, for rotationally mounting the eccentric shaft in the bearing support 3, and in the region of the connecting rod 2, it comprises an eccentric section 12 with an axis Y eccentric with respect to section 11. On the eccentric section 12, in the region of the connecting rod 2, an eccentric bushing 13 is arranged which comprises a cylindrical internal circumference corresponding to the external circumference of the eccentric section 12 and a cylindrical external circumference whose axis Z is eccentric with respect to the axes X and Y.

In FIG. 4, the largest possible quantity of the stroke of the tamper bar 1 is indicated, as the eccentricities between X and Y and Y and Z in the same radial plane sum up (the direction of the strokes of the tamper bar 1). If the eccentric bushing 13 is rotated about the axis Y relative to the eccentric section 12 and relative to the connecting rod 2, the proportion of its eccentricity between Y and Z which becomes effective at the connecting rod 2 is reduced, i.e. the stroke of the tamper bar 1 becomes shorter.

In FIG. 3, a straining ring 14 is fixed on the eccentric section 12 in a torque-proof manner by means of at least one straining screw 16, the straining ring 14 comprising a radial slot 15 and supporting a tappet E which here axially projects towards the eccentric bushing 13. After the straining screw 16 has been released, the straining ring 14 can be rotated in the circumferential direction together with the tappet E relative to the eccentric section 12 (or the eccentric shaft W) and can be fixed in a torque-proof manner by tightening the straining screw 16. In FIG. 3, the tappet E engages in a preselection area 18 which is here embodied in an annular extension 17 of the eccentric bushing 13 in the form of a recess extending in the circumferential direction whose circumferential extension is larger than the circumferential extension of the tappet E. Optionally, at least one further preselection area 18' is provided offset in the circumferential direction with respect to the preselection area 18, in which the tappet E can be selectively introduced, for example by shifting the released straining ring 14 in FIG. 3 to the left and then rotating and shifting it again to the right. It is conceivable to even provide at least one further preselection area (not shown). In case of several preselection areas 18, 18', they can have the same or different circumferential extensions. The positions of the tappet E and the preselection area 18, 18' can be interchanged at the eccentric shaft W and the eccentric bushing 13.

One can take from FIG. 4 that the respective preselection area 18 forms two end stops 19, which define predetermined tappet stop positions P1, P2 for the tappet E rotating with the eccentric shaft W in the one or in the other direction of rotation. A change between the positions P1, P2, can be accomplished just by a reversal of the direction of rotation of the eccentric shaft W as the rotational resistance of the eccentric bushing 13 in the connecting rod 2, conditioned by frictional resistances and the compacting resistance or inertia forces, forces the tappet E for example from the position P1 to the position P2 in which it then couples the eccentric bushing 13 with the eccentric shaft W in the selected direction of rotation in a torque-proof manner. By the change of the relative rotational position between the eccentric bushing 13 and the eccentric shaft W accomplished with the reversal of the direction of rotation (double arrow 21 in FIG. 5), the stroke effective at the tamper bar 1 is changed, e.g. from 4.0 mm to 2.0 mm for small pavement thicknesses, or from 8.0 mm to 4.0 mm for greater pavement thicknesses.

At least one further preselection area 18', offset in the circumferential direction with respect to the preselection area 18, can be appropriate if a smaller or greater stroke difference is required between the two strokes adjustable by a reversal of the direction of rotation due to a greater or a smaller circumferential distance between the end stops 19, 20. It could be sufficient to only provide one preselection area 18, as in FIG. 5, as the tappet E with the support (the straining ring 14) can be anyway rotated to any desired relative rotational position on the eccentric section 12 of the eccentric shaft W to make a preselection.

In FIGS. 3 to 5, the respective preselection area 18 or 18', respectively, is provided at the eccentric bushing 13 and the tappet E at the eccentric section 12 or the straining ring 14. The positions could also be interchanged. It would be furthermore conceivable to provide several tappets E at the straining ring 14 offset in the circumferential direction which can be selectively engaged in a preselection area 18, 18' and which optionally have different dimensions in the circumferential direction.

Figure 6:
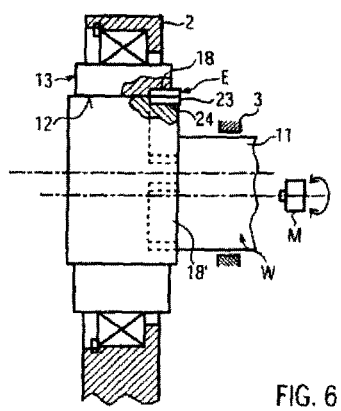
FIG. 6 shows a partial axial section of a further embodiment.

In the embodiment in FIG. 6, the tappet E is a pin or an adjustment spring 23 which is inserted in a groove 24 in the eccentric section 12, for example to be removable, to be transferred to the other preselection area 18' for engagement. As an alternative, several grooves 24 could be provided distributed in the eccentric section 12 in the circumferential direction, in each of which the tappet E can be optionally inserted.

Figure 7:
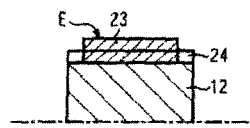
FIG. 7 shows a partial axial section of a further embodiment.

In the embodiment in FIG. 7, the tappet E is a longer adjustment spring 23 which is pressed into a longitudinally continuous groove 24 in the eccentric section 12 or is releasably inserted.

Figure 8:
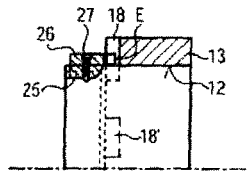
FIG. 8 shows an axial section of a further embodiment.

In the embodiment in FIG. 8, the tappet E is shaped to a sliding ring 26 which is connected to the eccentric section 12 in a torque-proof manner, for example via circumferential teeth 25, and which can be displaced in FIG. 8 to the left against the catch force of a ball catch 27 to engage the tappet E, if necessary, in the other preselection area 18'.

Figure 9:
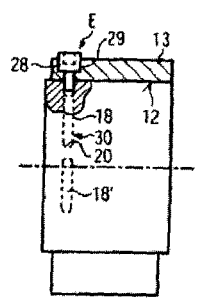
FIG. 9 shows an axial section of a further embodiment.

In the embodiment in FIG. 9, the tappet E is a screw 28 which is releasably fixed in an indentation 29 of the eccentric bushing 13 and engages in the selection area 18 here formed in the eccentric section 12 (a circumferential groove 30 in the eccentric section 12 limited in the circumferential direction). The circumferential groove 30 forms e.g. the end stop 20. A further preselection area 18' which is shorter or longer than the circumferential groove 30 in the circumferential direction, can, for example, be provided in the same radial plane of the eccentric section 12 to engage the tappet E there after the screw 28 has been released.

Figure 10:
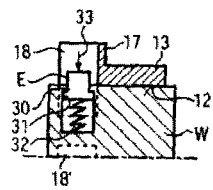
FIG. 10 shows an axial section of a further embodiment.

In the embodiment in FIG. 10, similar to FIG. 5, the preselection area 18 is embodied as a recess in the annular flange 17 of the eccentric bushing 13 or directly in the eccentric bushing 13. The tappet E is provided at a plunger 30 which can be shifted in an indentation 31 in the eccentric section 12 of the eccentric shaft W against the force of a readjusting spring 32 by radial force 33. To transfer the tappet E to another preselection area 18', the plunger 30 is pressed before e.g. the eccentric bushing 13 is rotated, until the engagement takes place in the other preselection area 18'.

Figure 11:
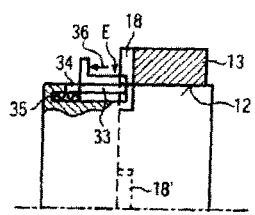
FIG. 11 shows an axial section of a further embodiment.

In the embodiment in FIG. 11, the tappet E is finally arranged at a slide 33 which can be axially shifted in a groove 34 in the eccentric section 12 similar to a dovetail and on which a readjusting spring 35 acts to bring it into the shown engagement position. By axial pressure (arrow 36), the tappet E can be selectively released from one preselection area 18 and engaged in another preselection area 18' after the eccentric bushing 13 has been rotated.

As the respective screed can comprise several tampers T, which each have separate drive motors, it is appropriate to connect the drive motors for example in parallel or in series, e.g. hydraulic motors, and to centrally activate a reversal of the direction of rotation. If change gears are provided, these should be connected in parallel and switchable simultaneously to perform the reversal of the direction of rotation at all tampers as soon as it is necessary to change the stroke of the tamper bar 1 within the extent fixed by the respective preselection area 18, 18'.

In a non-depicted alternative, the respective drive motor M could directly act at the eccentric shaft W.

A reversal of the direction of rotation can be performed by the machine operator or operators at an external control stand of the screed. Particularly appropriately, the reversal of the direction of rotation is effected by automatic control which knows and takes into consideration the respective laying parameters, for example suggests a reversal of the direction of rotation in case of a change of the laying speed and/or the pavement thickness, or causes the same at the beginning of the laying operation to adapt the stroke of the tamper bar 1 to the changed laying conditions. The reversal of the direction of rotation is preferably effected during a stop of the laying operation.

The invention claimed is:

1. Tamper of a screed of a road finishing machine comprising an eccentric shaft rotatably driven by a drive and having at least one eccentric section and an eccentric bushing supported on the eccentric section in at least one tamper bar operative stop position, the eccentric bushing being rotatably mounted in a connecting rod driving a tamper bar with stroke motions, the stroke of the tamper bar being variable by adjustment of the rotational positioning of the eccentric bushing and the eccentric section within a circumferential area, at least one tappet and at least one preselection area are provided between the eccentric shaft and the eccentric bushing, the preselection area being limited by two end stops for the tappet, the circumferential distance between the end stops is greater than the extension of the tappet seen in the circumferential direction, and the tappet preselection area is located at the eccentric shaft and the tappet being adjustable from a first tamper bar operative stop position to a second tamper bar stop position by reversing the direction of rotation of the eccentric shaft.

2. Tamper according to claim 1, wherein the preselection area is in or at the eccentric bushing and the tappet is in or at the eccentric shaft.

3. Tamper according to claim 1, wherein the preselection area is adjustable in the circumferential direction.

4. Tamper according to claim 1, wherein the tappet is movable between a plurality of circumferential positions in the circumferential direction.

5. Tamper according to claim 2, comprising a plurality of preselection areas with the same or different circumferential distances between the two tappet stop positions.

6. Tamper according to claim 1, comprising several tappets with the same dimensions and offset in the circumferential direction, to enable the tappets to be selectively introduced into the at least one preselection area.

7. Tamper according to claim 1, wherein the tappet comprises an adjustment spring in a longitudinal groove of the eccentric section of the eccentric shaft the adjustment spring engaging in the preselection area formed in the eccentric bushing.

8. Tamper according to claim 1, wherein the tappet is located at an adjustable support on the eccentric shaft.

9. Tamper according to claim 8, wherein the eccentric bushing comprises a plurality of recesses each having two end stops and defining preselection areas offset in the circumferential direction.

10. Tamper according to claim, 1 wherein the reversal of the direction of rotation can be controlled by an operator and/or automatically in response to at least one laying parameter.

11. Tamper according to claim 8 wherein the tappet is positioned in a slotted straining ring, that is rotatable relative to the eccentric shaft.

12. Tamper according to claim 10 wherein the laying parameter comprises the pavement thickness.

13. Tamper according to claim 10 wherein the laying parameter is automatically r transmitted to an operator.

14. Tamper according to claim 10 wherein the laying parameter comprises the laying speed of the of the road finishing machine.

* * * * *